United States Patent [19]

Unterseh

[11] Patent Number: 5,664,315
[45] Date of Patent: Sep. 9, 1997

[54] PROCESS FOR MANUFACTURING A MEASURING TUBE OF AN ELECTROMAGNETIC FLOW SENSOR

[75] Inventor: Roland Unterseh, Saint Louis, France

[73] Assignee: Endress + Hauser Flowtec AG, Reinach, Switzerland

[21] Appl. No.: 621,833

[22] Filed: Mar. 22, 1996

[30] Foreign Application Priority Data

Sep. 22, 1995 [EP] European Pat. Off. .............. 95114940

[51] Int. Cl.⁶ ................................................ H01F 41/00
[52] U.S. Cl. .......................... 29/602.1; 29/460; 73/861.11
[58] Field of Search ................................. 29/602.1, 460; 73/861.11, 861.14, 861.16, 861.17

[56] References Cited

U.S. PATENT DOCUMENTS

| 4,329,879 | 5/1982 | Appel et al. |
| 5,403,533 | 4/1995 | Meier. |

FOREIGN PATENT DOCUMENTS

| 3201562A1 | 8/1983 | Germany. |
| 61-294316 | 12/1986 | Japan. |
| 5-48846 | 7/1993 | Japan. |
| 1111981 | 5/1968 | United Kingdom. |

*Primary Examiner*—Carl E. Hall
*Attorney, Agent, or Firm*—Bose McKinney & Evans

[57] ABSTRACT

To introduce an insulation (3) of desired thickness into a measuring tube (1) of an electromagnetic flow sensor at low cost forming a tight joint, said measuring tube comprising a metal tube (2) having a respective metal flange (4, 5) at each end (21, 22), the respective metal flange (4, 5) at each end is slipped over the outside (23) of the metal tube in such a way that a front side (41, 51) of the metal flange projects beyond the end of the metal tube by an amount at least equal to the thickness of the insulation (3), and a rear side (45, 55) of the metal flange is permanently and tightly joined to the outside (23) of the metal tube. Before being slipped on, each metal flange is provided, from the front side, with a flute (42, 52) which forms a first annular groove (43, 53) at its inner end. A mandrel whose diameter is determined by the desired thickness of the insulation is introduced into the lumen of the metal tube. It has a filler inlet and two end flanges, one at each end, which cover the flutes of the respective metal flanges at the front side. The insulation is then filled in through the filler inlet in a liquid state and allowed to solidify.

5 Claims, 1 Drawing Sheet

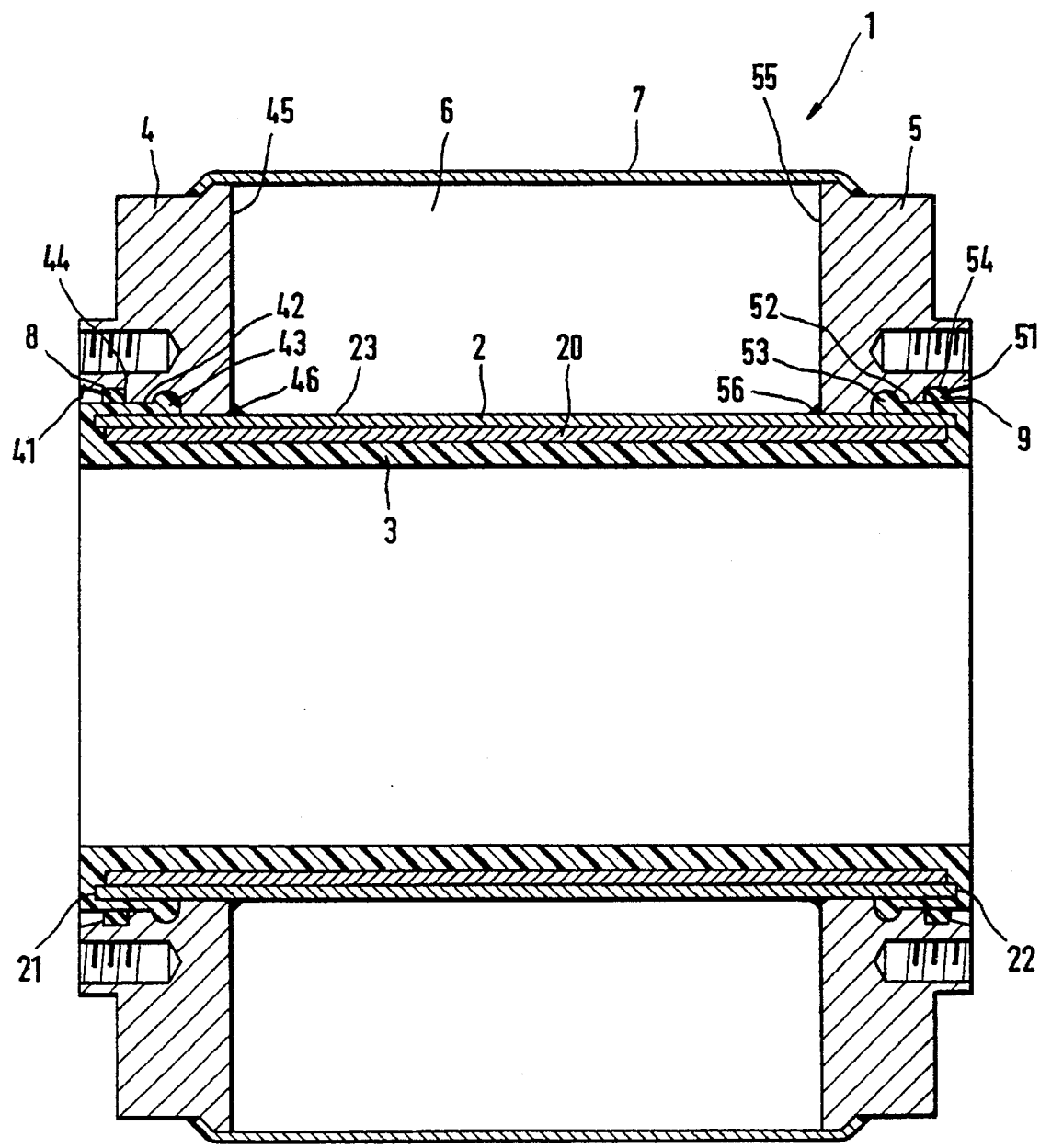

PROCESS FOR MANUFACTURING A MEASURING TUBE OF AN ELECTROMAGNETIC FLOW SENSOR

FIELD OF THE INVENTION

The present invention relates to a process for manufacturing a measuring tube of an electromagnetic flow sensor, said measuring tube comprising an insulation on its inner surface and a metal tube having a respective metal flange at each of its ends.

BACKGROUND OF THE INVENTION

Electromagnetic flowmeters, as is well known, measure the volumetric flow rate of an electrically conductive liquid flowing in a measuring tube. The part of the measuring tube which comes into contact with the liquid is electrically nonconductive so that a voltage induced by a magnetic field according to Faraday's law of induction would not be short-circuited if the measuring tube were completely made of metal, i.e., if the liquid came into contact with the metal. The magnetic field generally cuts the measuring tube perpendicular to the longitudinal axis of the tube.

Metallic measuring tubes, which, of course, must not be ferromagnetic so as not to interfere with the magnetic field, are commonly provided with an electrically nonconducting layer on the inner surface which serves as insulation; in the case of plastic or ceramic measuring tubes, such a layer is not necessary.

The induced voltage is picked off by means of galvanic or capacitive electrodes. Galvanic electrodes extend through the wall of the measuring tube, so that they contact the fluid, while capacitive electrodes are so mounted in the wall of the measuring tube as not to contact the fluid, or are mounted on the wall of the measuring tube.

U.S. Pat. No. 5,403,533 discloses a process for manufacturing a metallic measuring tube of an electromagnetic flow sensor which has an insulation on its inner surface, but no metal flanges, and wherein

- at each end of the measuring tube, a tube thickening provided with an external undercut is formed integrally on the measuring tube,
- a tubular insulating lining which is longer than the measuring tube is drawn into the lumen of the measuring tube, and
- the projecting ends of the measuring tube are drawn over the tube thickening into intimate contact with the respective undercut, where they are secured with an annular mounting if necessary.

JP-B 5-48846, which is based on JP-A 61-294316, discloses a metallic measuring tube of an electromagnetic flow sensor which has an inner insulation and metal flanges and in which

- at each end, the respective metal flange is formed on integrally,
- the front side of the metal flange being provided with projections and/or depressions,
- the depressions being filled with the insulation,
- the projections being embedded in the insulation.

DE-A 31 01 562 shows a similar design, but additionally a recess on that inner side of each flange which is the continuation of the inside surface of the metallic measuring tube.

British Patent 1,111,981 discloses an electromagnetic flowmeter for highly conductive liquids with a metallic measuring tube provided with a lining of steel which has belled ends which rest on the end faces of the respective flanges.

SUMMARY OF THE INVENTION

It has turned out that the first three of the above-mentioned prior-art variants for introducing the insulation into, and fixing it to the ends of, the measuring tube can meet neither the practical requirements on the tightness of the joint between metal tube and insulation, particularly in the flange area, nor the requirements on the simplicity and, thus, cost effectiveness of the manufacturing process.

To solve this problem, the invention therefore provides a process for manufacturing a measuring tube of an electromagnetic flow sensor, said measuring tube comprising an insulation of desired thickness on its inner surface and a metal tube having a respective metal flange at each of its ends, said process comprising the steps of:

- slipping the respective metal flange at each end of the metal tube over the outside of the latter in such a way that a front side of the metal flange projects beyond the respective end of the metal tube by an amount at least equal to the thickness of the insulation;
- permanently and tightly joining a rear side of the respective metal flange to the outside of the metal tube;
- prior to slipping the metal flanges over the metal tube, providing each of the metal flanges, from the respective front side, with a flute
- which forms a first annular groove at its inner end;
- introducing into the lumen of the metal tube a mandrel
- whose diameter is determined by the desired thickness of the insulation, and
- which has a filler inlet and two end flanges, one at each end,
- which cover the flutes of the respective flanges at the front side;
- filling in the insulation through the filler inlet in a liquid state; and
- allowing the insulation to solidify and removing the mandrel.

In a preferred embodiment of the invention, a second annular groove is formed in a central region of each flute, a sealing ring is placed into every other annular groove, and a mandrel is used which has an end flange at each of its ends which also covers the respective flute and the respective sealing ring.

In another embodiment of the invention, a means mechanically stabilizing the insulation, preferably an expanded-metal lattice, is mounted in the metal tube prior to introduction of the insulation.

In a further preferred embodiment of the invention, the insulation is filled in using a conventional transfer-molding technique.

One of the advantages of the invention is that after solidification of the insulation, no further process steps are required to work the metal tube or the insulation.

BRIEF DESCRIPTION OF THE DRAWINGS

The invention will now be explained in more detail with reference to the single figure of the accompanying drawing, which shows a cross section of one embodiment of a measuring tube manufactured by the process of the invention.

DETAILED DESCRIPTION OF THE DRAWINGS

The measuring tube 1 of an electromagnetic flow sensor, shown in the figure in a longitudinal cross section, can be installed in a conduit of a given diameter through which flows a fluid to be measured, but which is not shown for the sake of clarity. The above-mentioned electrodes are not shown, since their mounting does not take place until after completion of the process of the invention, so that it is outside the scope of the invention.

The measuring tube 1 comprises a metal tube 2 whose inner surface is covered with an insulation 3 of desired or predetermined thickness, and which has a respective metal flange 4, 5 at each of its ends. In a preferred embodiment of the invention, a means 20 for mechanically stabilizing the insulation 3, preferably an expanded-metal lattice, is disposed within the metal tube 2.

Metal tube 2 and metal flanges 4, 5 are of circular-ring-shaped cross section. A respective front side 41, 51 of each of the metal flanges 4, 5 projects beyond the respective end 21, 22 of the metal tube 2 by an amount at least equal to the intended thickness of the insulation 3.

The space 6 formed by the metal flanges 4, 5 and the metal tube 2 is closed by means of a sheet-metal part 7. The space 6 commonly serves to receive the coils generating the above-mentioned magnetic field and further components. If the sheet-metal part 7 is to be part of the magnetic circuit for the magnetic field generated by the coils, it will be ferromagnetic.

Before the manufacture of the measuring tube 1 begins, each metal flange 4, 5 is provided, from its respective front side 41, 51, with a flute 42, 52 which has an annular groove 43, 53 at its inner end. In accordance with the above-mentioned preferred embodiment, a second annular groove 44, 45 for receiving a sealing ring 8, 9 is provided in the central region of each flute 42, 52.

In the process for manufacturing the measuring tube 1, a metal tube 2 of desired length is first provided, and the metal flanges 4, 5 are prepared as stated above (flutes 42, 52; first annular grooves 43, 53; possibly second annular grooves 44, 54).

Then, at each end 21, 22 of the metal tube 2, a respective one of the metal flanges 4, 5 is slipped over the outside 23 of the metal tube 2 in such a way that, as already mentioned above, the front side 41, 51 of the metal flange 4, 5 projects beyond the respective end of the metal tube by an amount at least equal to the desired thickness of the insulation 3.

Next, a rear side 45, 55 of the respective metal flange 4, 5 is permanently and tightly joined to the outside 23 of the metal tube 2. This can be done by soldering, brazing or welding, which results in a soldered, brazed, or welded joint 46, 56. After that, the respective sealing rings 8, 9, e.g., suitable O-rings, are placed into the second annular grooves 44, 54, if the latter are present.

Then, a mandrel (not shown in the figure) is introduced into the lumen of the metal tube 2. The diameter of this mandrel is determined by the desired thickness of the insulation 3 and the diameter of the lumen. Thus, if the metal tube 2 has an inside diameter of 100 mm, and the insulation 3 is to be 2 mm thick, the mandrel must have a diameter of 96 mm.

Each end of the mandrel is provided with an end flange which covers the flute 42, 52 of the respective metal flange 4, 5 on the front side, i.e., which rests on the front surface 41, 51 of the respective metal flange 4, 5. If the sealing rings 8, 9 and, thus, the second annular grooves 44, 54 are present, each end flange of the mandrel must also cover the respective flute and the respective sealing ring.

Next, the insulation 3 is introduced in liquid form through a filler inlet of the mandrel, which can preferably be done using a conventional transfer-molding process: A thermoplastic material forming the insulation is first liquified and then forced under pressure into the space between metal tube 2 and metal flanges 4, 5 on the one hand and the mandrel on the other where it is allowed to solidify.

Instead of transfer molding, other processes can be used to fill in an initially liquid insulating material, i.e., generally a suitable plastic, which then solidifies. The mandrel is removed after solidification of the insulating material.

After removal of the mandrel, the insulation 3 covers not only the entire inner surface of the metal tube 2, but also the ends 21, 22 of the latter, and completely fills both the respective flutes 42, 52 and the respective first annular grooves 43, 53. Furthermore, the insulation 3 covers the sealing rings 8, 9, if these are present, and holds them in a position in which they increase the tightness of the joints between the insulation 3 and the respective flanges 4, 5.

The process of the invention is especially suited for the manufacture of measuring tubes with nominal diameters ranging between 10 mm and 200 mm.

I claim:

1. A process for manufacturing a measuring tube of an electromagnetic flow sensor, said measuring tube comprising an insulation of desired thickness on its inner surface and a metal tube having a respective metal flange at each of its ends, said process comprising the steps of:

slipping the respective metal flange at each end of the metal tube over the outside of the latter in such a way that a front side of the metal flange projects beyond the respective end of the metal tube by an amount at least equal to the thickness of the insulation;

permanently and tightly joining a rear side of the respective metal flange to the outside of the metal tube;

prior to slipping the metal flanges over the metal tube, providing each of the metal flanges, from the respective front side, with a flute which forms a first annular groove at its inner end;

introducing into the lumen of the metal tube a mandrel whose diameter is determined by the desired thickness of the insulation, and which has a filler inlet and two end flanges, one at each end, which cover the flutes of the respective flanges at the front side;

filling in the insulation through the filler inlet in a liquid state, and allowing the insulation to solidify and removing the mandrel.

2. A process as claimed in claim 1, further comprising the steps of:

forming a second annular groove in a central region of each flute;

placing a sealing ring into every other annular groove; and using a mandrel which has an end flange at each end which covers the respective flute and the respective sealing ring.

3. A process as claimed in claim 1 wherein prior to introduction of the insulation, a means mechanically stabilizing the metal tube is mounted in the metal tube.

4. A method as claimed in claim 2 wherein the means is an expanded-metal lattice.

5. A process as claimed in claim 1 wherein the insulation is filled in using a conventional transfer-molding process.

* * * * *